INVENTOR.
ROBERT B. STUART
BY Cumpston, Shaw
Stephens
ATTORNEYS

June 2, 1970 R. B. STUART 3,515,087
PLANING BOAT

Filed Sept. 20, 1968 3 Sheets-Sheet 2

INVENTOR.
ROBERT B. STUART
BY *Cumpston, Shaw and Stephens*

ATTORNEYS

United States Patent Office 3,515,087
Patented June 2, 1970

3,515,087
PLANING BOAT
Robert B. Stuart, Penn Yan, N.Y., assignor to Penn Yan Boats, Incorporated, Penn Yan, N.Y., a corporation of New York
Continuation-in-part of application Ser. No. 722,320, Apr. 18, 1968. This application Sept. 20, 1968, Ser. No. 776,829
Int. Cl. B63b 1/18; B63h 5/16
U.S. Cl. 114—66.5   39 Claims

ABSTRACT OF THE DISCLOSURE

A planing hull having a water channel about the propeller and a rudder at the stern end of said channel.

CROSS REFERENCES

This application is a continuation-in-part of my parent application Ser. No. 722,320 filed Apr. 18, 1968 and abandoned upon the effective filing of this application.

THE NEED FOR IMPROVEMENT

Hull and rudder design for planing boats is a subject of controversy and disagreement. Countless designs, combinations, and arrangements have been attempted, and no solution has been optimum. Design authorities even disagree on the effect of various known arrangements.

One planing hull recently preferred for many advantages is a "deep-V" hull defined and described below. It generally offers a smooth ride and good performing, planing, handling, and steering characteristics. However, it is also several important disadvantages. The draft of a deep-V hull at the center of the stern creates problems. An outboard motor or an inboard-outboard drive can be used, but fitting a single inboard engine to a deep-V hull requires that the engine be too far forward for proper balance and support in a relatively narrow portion of the V so that the shaft angle to a relatively deeply submerged propeller under the keel line of the hull will not be too steep. Inboard-outboard arrangements cost more than a generally simpler inboard drive, and are also more expensive to maintain, more easily damaged, and cost more to insure.

These shortcomings of the deep-V hull have been known for sometime, and the teachings of marine design authorities have not suggested workable solutions. The general object of this invention is to improve on the deep-V planing hull to reserve its desired qualities and overcome the drawbacks mentioned above.

Other objects of the invention include, without limitation:

(a) a deep-V planing hull that is safer, and provides an excellent ride, steering, performance, and handling;
(b) a single inboard drive for a deep-V planing boat arranged to have a well-balanced engine position and a favorable shaft angle;
(c) eliminating the expense of an inboard-outboard drive for a deep-V planing hull;
(d) a deep-V planing hull with a shallow draft and a protected propeller;
(e) a reaction drive for planing craft that allows full r.p.m. at any load;
(f) an improved rudder for planing craft; and
(g) general economy of construction and maintenance for a deep-V planing hull meeting the objects mentioned above.

These and other objects of the invention will be apparent hereinafter from the specification which describes the invention, its use, operation, and preferred embodiments' from the drawings which constitute a part of the disclosure, and from the subject matter claimed.

SUMMARY OF THE INVENTION

By the invention: a deep-V planing hull is provided with a water tunnel formed below the operating water-line in the after region of the hull to open at the stern; a propeller is arranged for revolving inside the tunnel; a fixed vane is arranged behind the propeller to extend upward from the center of the propeller to the top of the tunnel; and a pivotal rudder blade is arranged on a stock mounted closely aft of the vane with the blade extending aft of the stock from the top of the tunnel to the bottom of the propeller and forward of the stock below the vane from the center of the propeller to the bottom of the propeller. The inventive tunneled hull can be used with other rudders, and the inventive rudder can be used with other planing craft.

DETAILED DESCRIPTION

Figure 1:
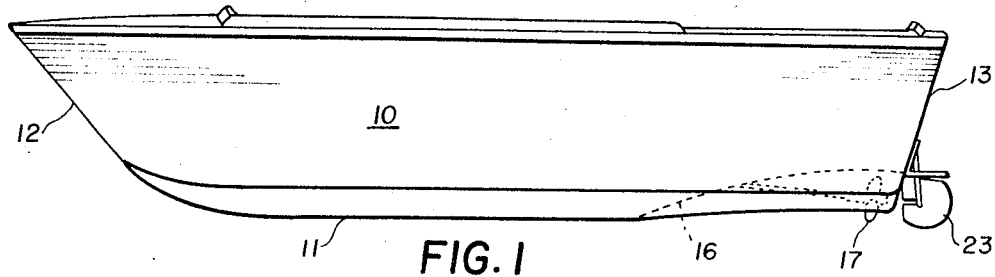
FIG. 1 is a side elevation of a preferred embodiment of the inventive planing boat.
Figure 2:
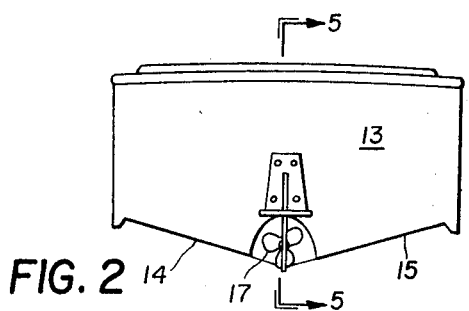
FIG. 2 is a stern elevation of the boat of FIG. 1.
Figure 3:
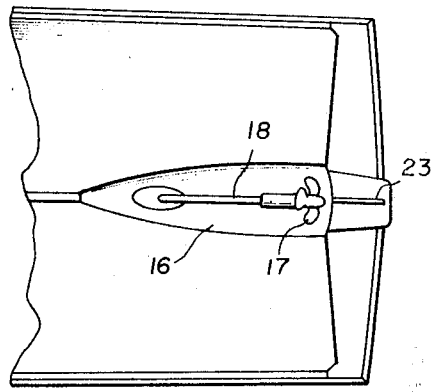
FIG. 3 is a bottom view of the after portion of the boat of FIG. 1.
Figure 4:
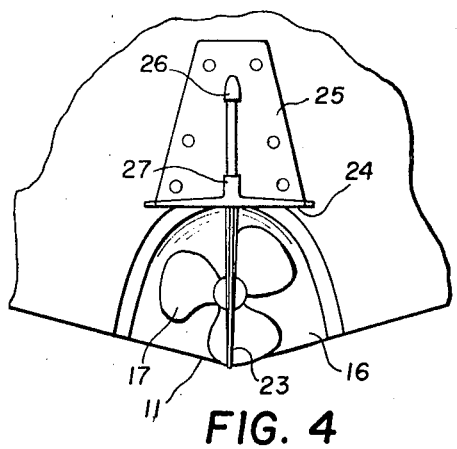
FIG. 4 is an enlarged fragmentary stern elevation of the boat of FIG. 2.

In the illustrated preferred embodiment of the invention, hull 10 is a deep-V planing hull as best shown in FIGS. 1 and 2. Hull 10 can have a variety of lengths, widths, shapes and sizes, and can include a variety of equipment within the spirit of the invention. Hull 10 has a generally flat keel line 11 extending from a bow 12 to a stern 13, and throughout the specification and claims, "keel line" refers not only to the illustrated flat portion of keel line 11, but its extension aft toward and beyond stern 13.

A deep-V hull is generally characterized by a low keel line 11 with the bottom portions of the hull on the either side of keel line 11 rising above the horizontal. For a hull to qualify as a "deep-V" hull the angle of bottom portions 14 and 15 on opposite sides of keel line 11 must be from 8° to 25° above the horizontal at the stern 13. The angle of hull bottom portions 14 and 15 generally increases toward bow 12. The resulting deep-V bottom knifes through the water to provide a smoother ride over waves and choppy surfaces than hulls with flat bottoms, round bottoms, or other configurations.

A planing hull is generally found in high speed, pleasure boats. Hulls referred to within the spirit of the invention as "planing" hulls are those that the displacement lift from bouyancy is replaced by dynamic lift as speed increases—dynamic lift being the force produced by water at relative velocity impinging against the inclined bottom of the hull. Dynamic lift need not attain any particular percentage of the total lift, but in faster and lighter hulls dynamic lift can approach 100% of the total lift at high speeds. Planing hulls are also characterized by relatively high speed propellers and relatively fast travel through the water, and although they are generally smaller craft, they can reach lengths of 50 feet or more.

Through the specification and claims "deep-V planing hull" refers to the above-described characteristics of deep-V and planing hulls.

The after portion of the bottom of the center of hull 10 is provided with a water tunnel 16. Tunnel 16 is formed as a recess rising above keel line 11 beginning aft of the mid-ship's line of hull 10 and extending toward stern 13. The surface forming tunnel 16 is generally shaped in cross-section as an inverted U that smoothly increases in size and diameter as extended aft to open fully at stern 13. Tunnel 16 is preferably made large eough to house propeller 17, and the top of tunnel 16 is below the operating waterline for hull 10.

Propeller 17 is mounted on shaft 18 leading aft from an inboard engine (not shown) arranged inside hull 10. Shaft 18 leads into tunnel 16 and is preferably nearly horizontal as illustrated to drive propeller 17 in as nearly vertical plane as possible. This produces the greatest possible horizontal vector for the thrust of propeller 17. Also, it permits optimum location of the engine for best balance in hull 10.

Propeller 17 is preferably arranged inside tunnel 16 and forward of stern 13 so as to operate above keel line 11. The blades of propeller 17 extend below the bottom of tunnel 16 as illustrated, but preferably not below the projected keel line 11. Also, propeller 17 is preferably fit closely within tunnel 16 and clears tunnel 16 by a small amount such as one inch or less.

The housing of propeller 17 within tunnel 16 reduces the chances of striking objects, and reduces the overall draft of hull 10. Tunnel 16 is preferably made no wider at its bottom than is necessary for housing propeller 17 so as not to reduce the floatation support for the stern end of hull 10 and not to reduce the dynamic lift of the hull when in motion.

Rudder 20 is arranged aft of the center of tunnel 16 behind stern 13 and propeller 17. Rudder 20 includes a strut or vane 21, a stock 22, and a blade 23. A spray plate 24 and integral bracket 25 support rudder 20 at the stern 13 of hull 10, and bracket 25 includes journals 26 and 27 supporting stock 22 for rotation.

Figure 6:
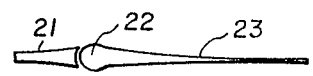
FIG. 6 is a cross-sectional view of the vane and rudder for the boat of FIG. 5 taken along the line 6—6 thereof.

Vane 21 is preferably formed integrally with plate 24 and extends below plate 24 to the center of propeller 17. The after edge of vane 21 is preferably faired to stock 22 as shown in FIG. 6 for minimum resistance and to prevent water flow between vane 21 and stock 22.

Stock 22 is turned by a conventional steering mechanism to adjust the position of blade 23. Blade 23 extends aft of stock 22 from the top of tunnel 16 to the bottom of propeller 17 and also extends forward of stock 22 below vane 21 from the center of propeller 17 to the bottom of propeller 17. The portion of blade 23 extending forward of stock 22 is preferably about 20% of the area of blade 23 for balancing rudder 20 and easing its steering. Also, the total area of vane 21 is preferably about 20% of the area of blade 23.

Figure 7:
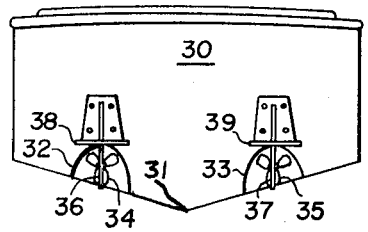
FIG. 7 is a stern elevation of a twin screw version of the inventive planing boat.

FIG. 7 shows a twin screw version of the inventive planing boat. Hull 30 is a deep-V planing hull with a low keel line 31. Twin tunnels 32 and 33 are formed on opposite sides of keel line 31 for housing respective propellers 34 and 35 as illustrated. Tunnels 32 and 33 are below the operating waterline for hull 30, are preferably smoothly shaped for minimum resistance to water flow, and preferably substantially enclose propellers 34 and 35. Propellers 34 and 35 can be arranged to extend below the tunnels 32 and 33, but preferably not below keel line 31. Rudders 36 and 37 are arranged aft of each tunnel 32 and 33 respectively, and spray plates 38 and 39 are arranged over each respective rudder. Preferably, rudders 36 and 37 have the same general construction of vane and blade as shown for rudder 20 previously described. The operating effect of the twin screw boat of FIG. 7 is substantially the same as the boat of FIGS. 1–6.

The inventive planning boat with the preferred hull, tunnel, and rudder combination has been built and tested and found to perform with surprising success. A full and accurate theoretical explanation of its operation is not known but as best understood, its operation will be described below. The invention is not limited to any particular theory of operation.

Figure 5:
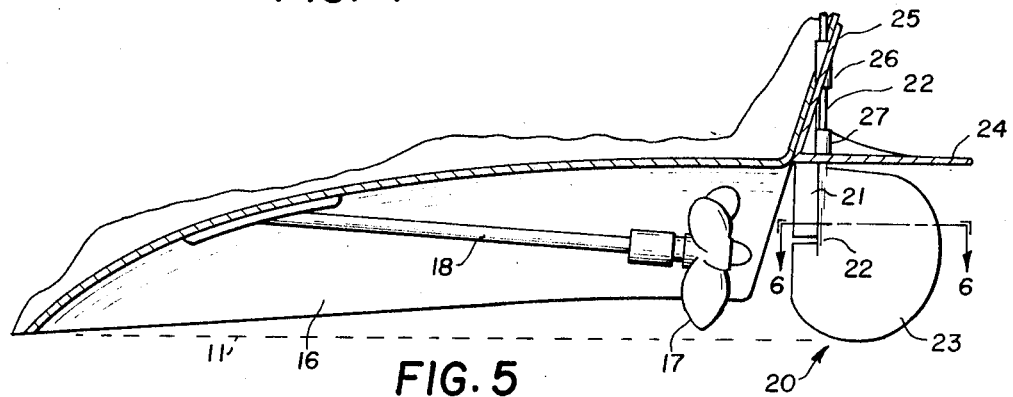
FIG. 5 is a fragmentary cross-section of the stern portion of the boat of FIG. 2 taken along the line 5—5 thereof.

The high speed stream of water through tunnel 16 is given a high r.p.m. spiral motion as it is directed aft by propeller 17. Fixed vane 21 as arranged at the top center of such stream tends to oppose the spiral motion of the slip stream and direct water straight aft from propeller 17. For the normal right hand propeller, the upper portion of the stream is spiraled to turn against the face of vane 21 that is illustrated in FIG. 5, and vane 21 directs the upper portion of the slip stream straight aft. The confinement of the water stream within tunnel 16 makes its upper portion particularly well-defined so that vane 21 plays an important role in deflecting the spiral, stabilizing rudder 20, and preventing torque from the spiral stream from reflecting back through the steering mechanism. Vane 21, thus contributes to ease and accuracy of steering.

The lower portion of the spiral stream directed aft from propeller 17 is affected by the relatively still water just beyond the reach of blades 17 and is not so well-defined as the upper portion of the slip stream. The portion of rudder blade 23 extending forward of stock 22 into the lower half of the slip stream thus operates in a less sharply defined portion of the slip stream for balancing rudder 20. The resulting steering effect of rudder 20 is practically equal between port and starboard turns, and the effort to lay the rudder on either side is approximately equal and relatively easy.

Spray plate 24 arranged over rudder 20 not only supports vane 21 but keeps down spray from rudder 20 and the wake of the boat.

Since the slip stream of water in the tunnel and aft of the propeller is fairly well-defined by the tunnel, the resulting effect is a jet-like stream of water directed aft from the stern. This results in a reaction drive similar to a jet engine. One of the advantages of such a drive arrangement is that the engine and propeller r.p.m. do not decrease even under heavy load. As the load is increased in conventional planing craft, the propeller works against an effectively greater head and the increased load reduces the engine r.p.m. for a power loss. This is particularly unfortunate since the fullest possible power is needed to handle the increased load.

With the reaction drive effect of the inventive tunnel and propeller arrangement, increasing or decreasing the load in the boat does not change the load on the propeller so that full power and full r.p.m. can be applied even with a heavily loaded boat. This insures that full driving power is available to propel heavy loads.

Rudder 20 can be made in a variety of sizes and shapes, and although the general arrangement of vane 21 and blade 23 is preferred, these members can be formed in a variety of shapes. Spray plate 24 and bracket 25 can be omitted or can be formed in other shapes. The rudder stock, journals, or pintles can be varied and the fixed vane can serve as a strut supporting the blade. Furthermore, the preferred rudder 20 need not be used on the inventive tunneled hull and can be used with other planing hull and propeller arrangements.

Figure 8:
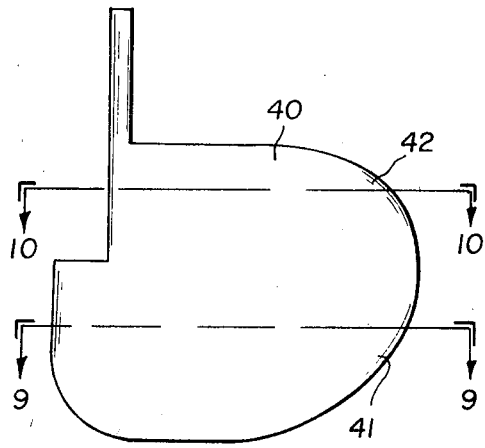
FIG. 8 is an elevational view of a preferred rudder blade for the inventive boat.
Figure 9:
FIG. 9 is a cross-section of the rudder blade of FIG. 8 taken along the line 9—9 thereof.
Figure 10:
FIG. 10 is a cross-section of the rudder blade of FIG. 8 taken along the line 10—10 thereof.

FIGS. 8–10 show a preferred rudder blade 40 for use with the inventive boat. Blade 40 is especially shaped to provide more positive steering to both starboard and port and to eliminate softness or sluggishness in the steering and excessive torque or bias feedback to the steering wheel. This is accomplished by slight bends in the trailing edge of rudder blade 40, as best shown in FIGS. 9 and 10.

Bend 41 of FIG. 9 turns the trailing edge of blade 40 slightly to port, and bend 42 of FIG. 10, turns the trailing edge of blade 40 slightly to starboard. Bends 41 and 42 are somewhat exaggerated for illustration. The preferred bends are quite small and do not require very large areas of blade 40. For example, bends on a three-inch radius extending about one inch inward from the trailing edge of blade 40 ordinarily are ample.

Bends 42 and 41 are shown respectively in the upper and lower portions of blade 40 but their relative positions can be interchanged with the same result. The starboard bend 42, regardless of its vertical location, effects more positive steering to starboard, and the port bend 41 effects more positive steering to port.

Figure 11:
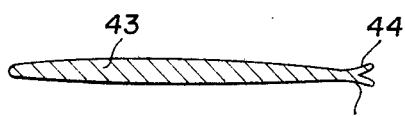
FIG. 11 is a central cross-section of an alternative rudder blade for use in the inventive boat.

FIG. 11 shows a cross section of an alternative rudder blade 43 taken along a horizontal mid-section line to show a pair of trailing edge bends 44 and 45 that are adjacent to each other at the trailing edge of rudder blade 43. Bends 44 and 45 function in the same way as bends 41 and 42 except they are positioned opposite each other rather than arranged vertically relative to each other.

Figure 13:
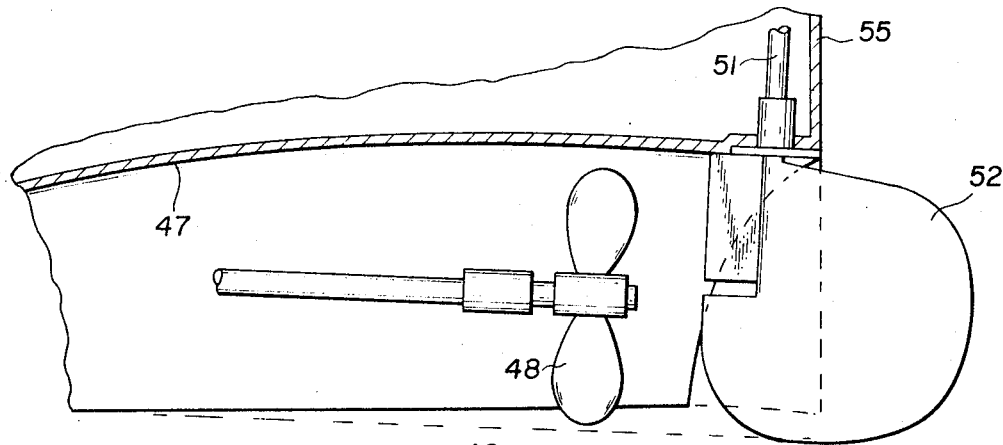
FIG. 13 is a partially cut-away, elevational view of the tunnel and rudder arrangement of FIG. 12.
Figure 12:
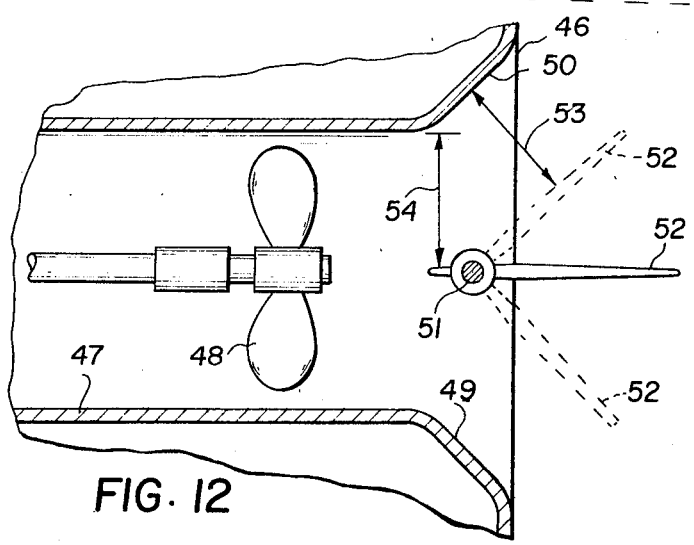
FIG. 12 is a bottom plan view of an alternative preferred tunnel shape for the inventive boat.

FIGS. 12 and 13 show a flared tunnel arrangement allowing a stern extension of the inventive boat. Tunnel 47 housing propeller 48 in hull 46 is the same in shape and operation as previously described tunnels except for its stern end which is turned outward at both the port and starboard sides in flares 49 and 50. This allows the stock 51 of rudder 52 to be placed inside the after end of tunnel 47 between flares 49 and 50. The full port and starboard positions of rudder 52 are shown in broken lines, and flares 49 and 50 are made wide enough so that the distance 53 between rudder 52 and either flare 49 or 50 is substantially equal to the distance 54 between the rudder stock and the straight sidewall of tunnel 47. Then, with the rudder laid fully to either starboard or port, the jet stream of water aft from propeller 48 is not throttled off, but has its usual full passageway past rudder 52. Rudder 52 will not then obstruct the jet stream, but will direct it freely toward either side for positive steering.

The arrangement shown in FIGS. 12 and 13 allows stern 55 to be extended aft beyond the normal to overhang rudder 52. A downward and aft rake of stern 55 is shown in FIG. 13, but stern 55 could also be vertical or raked in the opposite direction if desired. Such a stern extension not only protects rudder 52, but gives a broader support surface at the after end of hull 46. This provides more dynamic lift when planing and a greater flotation support tending to keep the stern up and the bow down. Also, the flared tunnel and rudder arrangement illustrated in FIGS. 12 and 13 affords more positive steering when backing down, because rudder 52 operates in water that is somewhat restricted by tunnel 47 for a more forceful effect under sternway.

Figure 14:
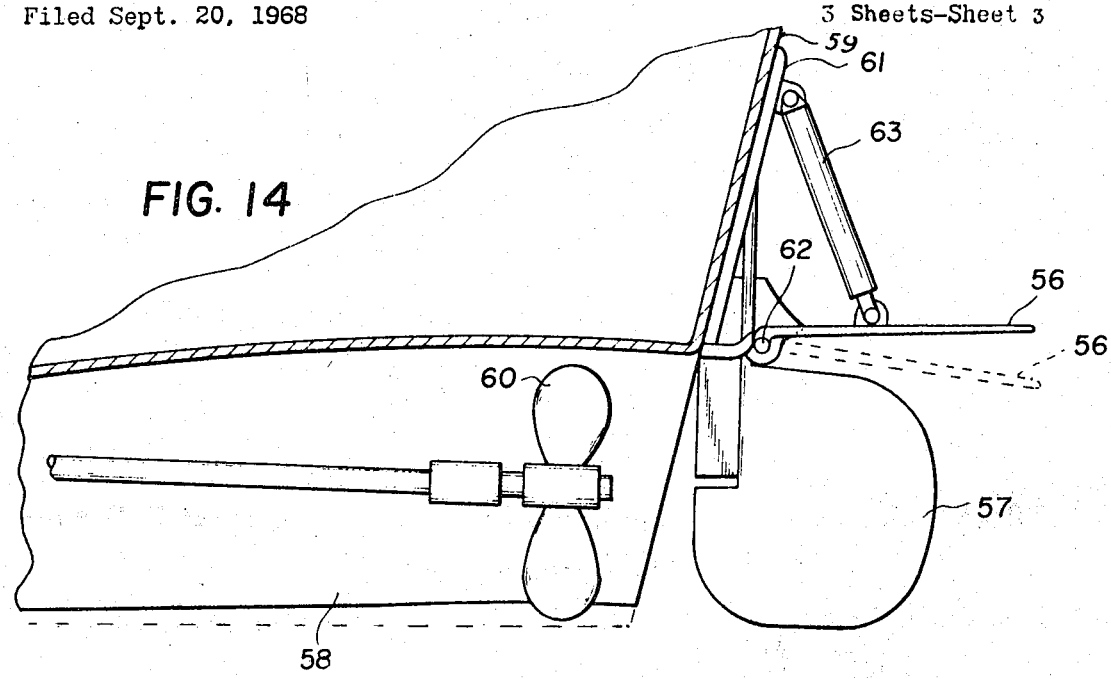
FIG. 14 is a partially cut-away, elevational view of a stabilizer spray plate arrangement for the inventive boat.
Figure 15:
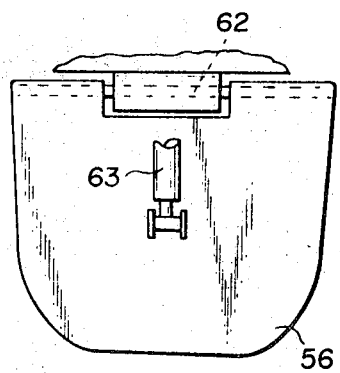
FIG. 15 is a plan view of the spray plate of FIG. 14.
Figure 16:
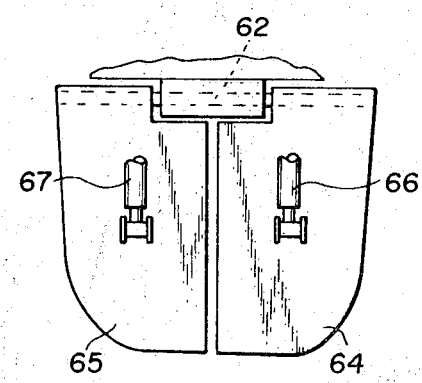
FIG. 16 is a plan view of an alternative preferred spray plate for the inventive boat.

FIGS. 14–16 show adjustable spray plates for trimming or stabilizing the inventive boat. Spray plate 56 is similar to previously described spray plate 24 in being arranged over rudder 57 at the after end of tunnel 58 in hull 59. Spray plate 56 then is approximately tangent to the top of the jet stream of water directed aft from propeller 60. A support bracket 61 fastened to the stern of hull 59 supports spray plate 56 and rudder 57, a hinge 62 joins spray plate 56 to bracket 61 on a horizontal axis so that spray plate 56 is adjustable vertically over the top of the jet stream aft from tunnel 58. Hydraulic plunger 63 is connected between support bracket 61 and spray plate 56 for adjusting spray plate 56 vertically. The solid lines show an approximate upper position of spray plate 56. Hydraulic plunger 63 is preferably arranged to allow adjustment of spray plate 56 from controls located inside hull 59, but other adjustment means such as a multi-positioned rod can be used to adjust spray plate 56 as desired.

The lowering of spray plate 56 into the jet stream of water past rudder 57 tends to deflect such jet stream downward and to lift the stern end of hull 59. This can be done whenever hull 59 is loaded so as to carry its stern lower than desired. Spray plate 56 is more effective than conventional trim tabs since it operates on a relatively high-velocity jet stream of water giving a much greater dynamic lift per square inch of area than previously known trim tabs operating only at hull speed. Thus, the reaction drive, jet stream from tunnel 58 cooperates with adjustable spray plate 56 to make a small, simple, and very effective stabilizer or trim tab.

FIG. 16 shows a split spray plate forming a pair of spray plate trim tabs 64 and 65 independently adjustable on hinge 62 by hydraulic plungers 66 and 67 for port and starboard trimming of the inventive boat. The positioning of tabs 64 and 65 is preferably controlled by the boat operator to adjust for changes in the horizontal trim of the boat. If one of the tabs 64 or 65 is lowered relative to the other the lift at the stern of the boat will tend to be greater on the side of the lowermost tab to correct any uneven port and starboard loading of the boat. Again, tabs 64 and 65 are relatively more efficient than previously known trim tabs because of their operation over the relatively high-velocity jet stream of water giving them enhanced dynamic lift. At the same time, both single and double spray plates operate to keep down the spray at the stern of the boat and make a smooth, even wake.

It will thus be seen that the invention eliminates prior art disadvantages of deep-V hulls and preserves their best characteristics in a safe, good-riding, good-handling, planing boat. The invention also contributes to positive and effective steering, and trimming of the boat. Persons wishing to practice the invention should remember that other embodiments and variations can be adapted to particular circumstances. Even though one point of view is necessarily chosen in describing and claiming the invention, this should not inhibit broader or related applications within the spirit of the invention. For example, the sizes, shapes and orientation of tunnels, rudders, propellers, vanes and spray plates can all be varied within the scope of the invention. Also, many changes can be made by those skilled in the art in adapting the invention to various boats and construction methods.

I claim:
1. A planing boat comprising:
 (a) a deep-V planing hull;
 (b) the under surface of said hull being formed to define a water tunnel;
 (c) said tunnel-forming surface beginning aft of the mid-ships line of said hull and extending above the keel line of said hull in an inverted U-shape that smoothly increases the cross sectional area of said tunnel as extended aft from its forward end, said tunnel being open at the stern of said hull;

(d) said tunnel-forming surface extending below the operating waterline for said hull;

(e) a propeller arranged for revolving in said tunnel forward of the stern end thereof;

(f) said propeller being nearly the diameter of said tunnel in the region of the plane of said propeller;

(g) said propeller being substantially above the keel line of said hull at said plane of said propeller; and (h) a rudder arrangeed in the region of the stern end of said tunnel and extending down approximately to the bottom of said propeller.

2. The boat of claim 1 wherein the port and starboard sides of said tunnel are flared outward.

3. The boat of claim 2 wherein said stern of said hull is raked downward and aft.

4. The boat of claim 1 wherein said rudder includes a fixed vane extending from the region of the center of said propeller to the region of said tunnel-forming surface, a rudder stock pivotally mounted closely aft of said vane, a blade arranged on said stock, said blade extending aft of said stock from the region of the top of said tunnel to the region of the bottom of said propeller and forward of said stock below the region of the center of said propeller 5. The boat of claim 4 wherein said stock and said vane are approximately vertical.

6. The boat of claim 4 wherein approximately 20% of the area of said blade extends forward of said stock.

7. The boat of claim 6 wherein said vane has an area of approximately 20% of said blade 8. The boat of claim 1 wherein a portion of the starboard face of said blade in the region of the trailing edge thereof is curved to starboard, and a portion of the port face of said blade in the region of said trailing edge is curved to port.

9. The boat of claim 8 wherein vertically separated portions of said trailing edge are curved respectively to starboard and to port.

10. The boat of claim 1 including a spray plate secured to the stern of said hull and extending aft closely over said rudder.

11. The boat of claim 10 including means for hinging said spray plate to said hull and means for vertically adjusting the position of said spray plate.

12. The boat of claim 11 wherein said vertical adjusting means is hydraulic.

13. The boat of claim 11 wherein said spray plate comprises a pair of tabs adjacent each other along the fore and aft centerline of said hull and said vertical adjustment means is independent for each of said tabs.

14. The boat of claim 13 wherein each of said vertical adjusting means is hydraulic.

15. The boat of claim 1 wherein said tunnel is formed at the center of the bottom of said hull above said keel line.

16. The boat of claim 1 including a pair of said tunnels formed on opposite sides of said keel line, one of said propellers arranged in each of said tunnels, and one of said rudders arranged aft of each of said tunnels.

17. A planing boat comprising:

(a) a deep-V planing hull;

(b) the under surface of the after region of said hull being formed to define a water tunnel extending aft a substantial distance and opening at the stern of said hull;

(c) said tunnel-forming surface extending below the operating water line for said hull;

(d) a propeller arranged for revolving in the after region of said tunnel;

(e) vane means arranged aft of said propeller and oriented to deflect the propeller water output from its spiral path toward a straight aft flow;

(f) a rudder blade arranged on a stock pivotally supported aft of said vane means; and (g) said blade extending from the region of the top of said tunnel to the region of the bottom of said propeller.

18. The boat of claim 17 wherein said vane means comprises a substantially plane element approximately parallel with the keel line of said hull and extending generally radially of said propeller.

19. The boat of claim 18 wherein said vane element extends vertically from the region of the center of said propeller to the region of the top of said tunnel.

20. The boat of claim 19 wherein said stock is approximately vertical, and the after edge of said vane is faired to said stock.

21. The boat of claim 20 wherein a portion of said blade extends forward of said stock below said vane to balance said rudder.

22. The boat of claim 21 wherein said vane has an area of approximately 20% of said blade.

23. The boat of claim 22 wherein a portion of the starboard face of said blade in the region of the trailing edge is curved to starboard, and a portion of the port face of said blade in the region of said trailing edge is curved to port.

24. The boat of claim 23 wherein vertically separated portions of said trailing edge are curved respectively to starboard and to port.

25. The boat of claim 17 wherein said tunnel-forming surface is entirely below said operating water line for said hull.

26. The boat of claim 25 wherein said tunnel-forming surface extends above the keel line of said hull in an inverted U-shape that smoothly increases the cross-sectional area of said tunnel as extended aft to said propeller.

27. The boat of claim 17 wherein a portion of said blade extends forward of said stock to balance said rudder.

28. The boat of claim 27 wherein said stock is approximately vertical, and approximately 20% of the area of said blade extends forward of said stock.

29. The boat of claim 17 including a spray plate secured to the stern of said hull and extending aft closely over said rudder, and said vane means comprising a generally plane element extending downward from said spray plate.

30. The boat of claim 29 wherein said spray plate includes a bracket extending upward at the stern of said hull and having means for pivotally supporting said stock.

31. The boat of claim 29 including means for hinging said spray plate to said hull and means for vertically adjusting the position of said spray plate.

32. The boat of claim 31 wherein said vertical adjusting means is hydraulic.

33. The boat of claim 31 wherein said spray plate comprises a pair of tabs adjacent each other along the fore and aft centerline of said hull, and said vertical adjustment means is independent for each of said tabs.

34. The boat of claim 33 wherein each of said vertical adjusting means is hydraulic.

35. The boat of claim 17 including a pair of said tunnels formed on opposite sides of said keel, one of said propellers arranged in each of said tunnels, and one of said rudders arranged aft of each of said propellers.

36. The boat of claim 17 wherein said tunnel forming surface is flared horizontally outward at the stern end of said tunnel.

37. The boat of claim 36 wherein said stern of said hull is raked downward and aft.

38. The boat of claim 17 wherein a portion of the starboard face of said blade in the region of the trailing edge thereof is curved to starboard, and a portion of the port face of said blade in the region of said trailing edge is curved to port.

39. The boat of claim 38 wherein vertically separated portions of said trailing edge are curved respectively to starboard and to port.

References Cited

UNITED STATES PATENTS

| | | | |
|---|---|---|---|
| 835,530 | 11/1906 | Huff | 115—39 |
| 1,835,564 | 12/1931 | Grayson et al. | 114—66.5 |
| 2,134,042 | 10/1938 | Hoffman | 115—39 |

FOREIGN PATENTS 930,558   7/1963   Great Britain.

ANDREW H. FARRELL, Primary Examiner

U.S. Cl. X.R.

114—57; 115—39